H. G. IRWIN.
INSECTICIDE DISPENSING RECEPTACLE.
APPLICATION FILED DEC. 22, 1919.
1,370,110.
Patented Mar. 1, 1921.
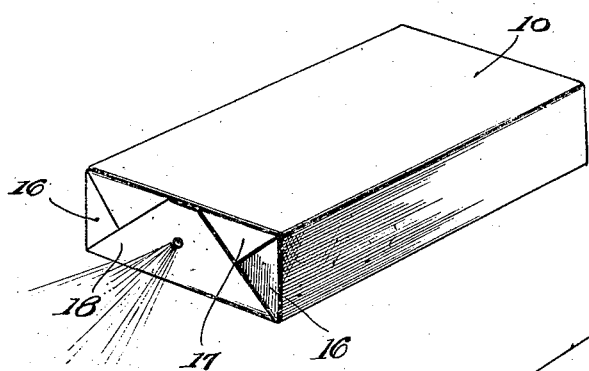
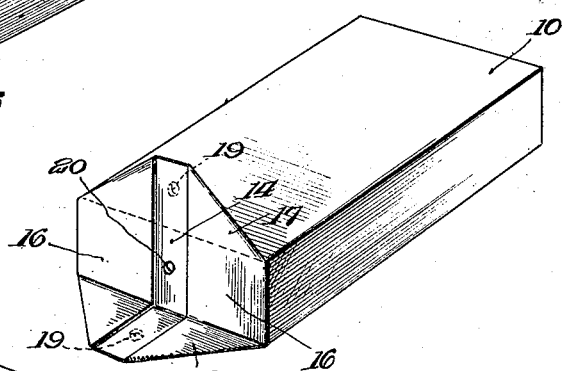
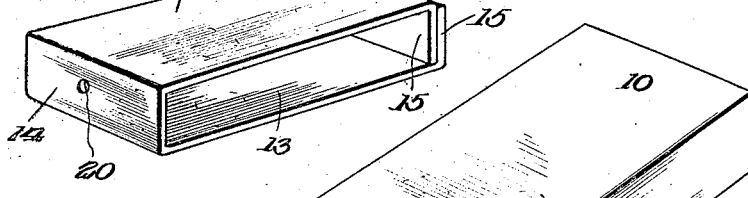
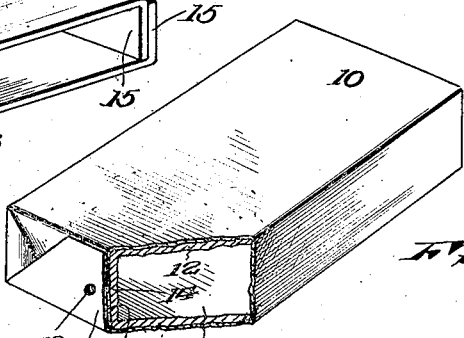
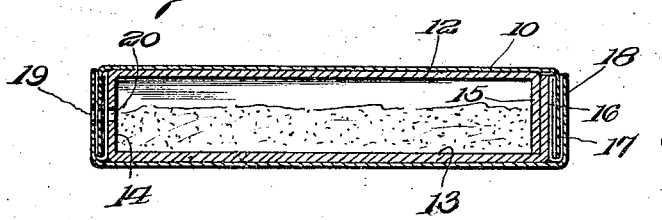
Inventor.
H. G. Irwin,
by Lacy & Lacy,
Attys.

UNITED STATES PATENT OFFICE.

HERBERT G. IRWIN, OF FLOYDADA, TEXAS.

INSECTICIDE-DISPENSING RECEPTACLE.

1,370,110.  Specification of Letters Patent.  Patented Mar. 1, 1921.

Application filed December 22, 1919. Serial No. 346,764.

*To all whom it may concern:*

Be it known that I, HERBERT G. IRWIN, a citizen of the United States, residing at Floydada, in the county of Floyd and State of Texas, have invented certain new and useful Improvements in Insecticide-Dispensing Receptacles, of which the following is a specification.

This invention relates to improvements in dispensing receptacles especially adapted for containing and dispensing insecticides.

An important object of this invention is to provide a receptacle for dispensing insecticides which has novel means whereby the insecticide may be discharged in a fine spray on to plants, animals or any articles which have been attacked by insects.

A further object of this invention is to provide a dispensing receptacle for insect powders having a frame or body which may be squeezed or pressed between the fingers to function as a bellows for dispensing the powder when the receptacle is in use.

A further object of this invention is to provide a powder dispensing receptacle which by reason of its cheapness of manufacture may be discarded after all of the powder in the same has been discharged.

A further object of the invention is to provide a powder dispensing receptacle which is of highly simplified construction, neat in appearance and desirable in use.

Other objects and advantages of the invention will be apparent during the course of the following description.

In the accompanying drawing forming a part of this application and in which like numerals are employed to designate like parts throughout the same:

Figure 1 is a perspective of the improved receptacle for dispensing insecticides, Fig. 2 is a similar view of the receptacle, the casing or cover of the same being shown partly open, Fig. 3 is a central vertical longitudinal section through the same, Fig. 4 is a perspective of the same, parts being broken away, Fig. 5 is a perspective view of a combined bellows and supporting body.

In the drawings wherein for the purpose of illustration is shown a preferred embodiment of the invention, the numeral 10 designates the casing or cover of the receptacle which may be formed of a material possessed of sufficient strength to withstand continued use. It has been found that manila paper serves admirably for this purpose though it is obvious that another desired material may be employed without departing from the spirit of the invention. As illustrated in Figs. 1 and 2, the casing or cover 10 is of rectangular form and receives a yieldable supporting body 11. The supporting body 11 is preferably formed from a yieldable length of cardboard bent upon itself to form the upper and lower sides 12 and 13 respectively which are joined by a connecting portion or end section 14. The end portions 15 of the elongated length of cardboard are extended inwardly and are overlapped so as to form the other end of the supporting body. By this construction the longitudinal sides of the supporting body are left open so that the upper and lower sides 12 and 13 may be squeezed or pressed inwardly during the use of the body as a bellows.

As indicated in Fig. 2, the body 11 is snugly arranged within the casing 10 which has its end portions folded in from its sides to provide sealing folds 16. The sealing folds 16 which are arranged at each end of the body are covered by upper and lower sealing folds 17 and 18 respectively. The sealing sections 17 and 18 are obviously folded over the end portions of the body and are secured to the folds 16 by a suitable paste or glue.

The upper and lower folds 17 and 18 are provided with weakened portions 19 which are adapted to register with a discharge aperture 20 in the end 14 of the body so as to permit of the discharge of the powder from the body.

The overlapped folds 16, 17 and 18 serve to strengthen and reinforce the body and thereby greatly prolong the period of usefulness of the receptacle. At this point it might be stated that the folds 17 and 18 are punctured by the purchaser of the receptacle when it is desired to use the same. By this means the powder within the receptacle is effectively prevented form leaking while being handled in trade. The receptacle is partly filled with the desired powder while being assembled so that the necessity of selling the powder and the receptacle separately is dispensed with. By reason of the cheapness of manufacture of the receptacle it is possible to discard the same after the powder has been entirely used. As stated above, the holes in the folds of the cover or casing are made by the purchaser so that when it is desired to use the powder for spraying plants or the like the bellows may be operated by depressing the upper and lower sections 12 and 13. In this connection it will be noted that the member 11 serves a dual function, that of supporting the casing in the proper shape; and as a bellows.

Having thus described the invention, what is claimed is:

1. A powder dispensing receptacle including a casing, and a combined bellows and body arranged within the casing and comprised solely of a single length of yieldable material formed with yieldable parallel sections and rigid end walls.

2. A powder dispensing receptacle including a casing formed of a yieldable material, and a combined supporting body and bellows arranged within the casing and formed from a single length of yieldable material arranged in rectangular formation for forming a pair of parallel yieldable sections and a pair of rigid end walls.

3. A powder container and dispensing receptacle including a casing formed of a yieldable material, and a supporting body arranged within the casing and including a pair of parallel yieldable sections and rigid end walls connected to said parallel sections, one end portion of said body being provided with a discharge aperture, said casing being provided with a weakened portion adapted to be punctured for forming an aperture in alinement with said first named aperture.

4. A powder containing and dispensing receptacle including a supporting body formed of an elongated length of yieldable material formed to provide a pair of spaced parallel yieldable sections and a rigid connecting portion, the end portions of said length of yieldable material being extended inwardly and overlapped for forming a rigid end wall, and a casing arranged about the body.

5. As an article of manufacture, a combined bellows and supporting body formed from a single length of yieldable material formed to provide a pair of spaced yieldable sections and a connecting rigid end wall, the end portions of said length of yieldable material being overlapped for forming a second rigid end wall.

6. As an article of manufacture, a powder container having a dispensing receptacle including a combined supporting body and bellows having upper and lower sides and rigid end walls connecting said sides, and a casing receiving said body and having its end portions provided with folds extending over the ends of said body, one end of the body and the adjacent folds being provided with discharge apertures.

In testimony whereof I affix my signature.

HERBERT G. IRWIN. [L. S.]